Patented Jan. 25, 1938

2,106,244

UNITED STATES PATENT OFFICE

2,106,244

PROCESS FOR BREAKING PETROLEUM EMULSIONS

Melvin De Groote, St. Louis, Mo., assignor to The Tret-O-Lite Company, Webster Groves, Mo., a corporation of Missouri No Drawing. Application June 21, 1937, Serial No. 149,475

15 Claims.  (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated for use in my process is obtained by esterification of aromatic sulfonamides containing an alkylol radical with a polybasic carboxy acid. The alkylol radicals are characterized by the presence of hydroxy alkyl residues derived from monohydric alcohols. For instance, if sulfonamides are converted into a sulfonchloride and such material reacted with monoalkylolamines or dialkylolamines, there are produced compounds which are suitable for esterification with polybasic carboxy acid, such as phthalic acid, oxalic acid, maleic acid, tartaric succinic acid, etc.

The aromatic nucleus of the sulfonamide may be monocyclic, as in monohydroxy-alkyl benzene sulfonamides, or may be polycyclic, as in monohydroxy alkyl naphthalene sulfonamides. They may be substituted, for example, by alkyl groups, amino groups, hydroxy groups, halogen groups, etc. In other words, they may be derived from chlorbenzene, phenol, aniline, toluene, or the like, or other similar compounds which are polycyclic in nature.

When compounds of the kind described are obtained by esterification, one may consider that the hydrogen atom of the hydroxyl of the hydroxy alkyl group is replaced by a radical derived by dehydroxylation of a polybasic carboxy acid. Ordinarily, the word "acyl" is employed to indicate the radical obtained by dehydroxylation of a monobasic carboxy acid, or by dehydroxylation of all the carboxyls of a polybasic carboxy acid. In a polybasic carboxy acid, where only one hydroxyl of one carboxyl group is removed and the other carboxyl groups are unchanged, the term "acid acyl" may be employed. For the sake of convenience, this will be considered as a species of the broader genus indicated by the word "acyl". There is no intention that the words "acyl" or "acid acyl" should contemplate acids obtained by the removal of hydroxyls of organic acids, other than carboxy acids, and thus excludes radicals of the kind which may be obtained from a sulfonic acid by the removal of the hydroxyl radicals.

The nitrogen atom of a sulfonamide radical may be attached to a single esterified monohydroxy alkyl group, as, for instance, in the phthalic acid esters of benzene, toluene, xylene, naphthalene, amyl naphthalene, or di-amyl naphthalene, monohydroxy ethyl sulfonamides, etc. In other words, in these instances, there is only one alkylol radical, and thus only one available alcoholic hydroxyl. If reaction takes place with a polybasic carboxy acid, such as phthalic acid, the radical which replaces the hydrogen of the alkylol hydroxyl is, as above stated, an acyl radical, but since it contains a free carboxyl radical, it may be defined more specifically as an acid acyl radical. On the other hand, it is also obvious that two moles of a sulfonamide containing only one alkylol group can be reacted with one mole of phthalic anhydride so as to give a neutral product; or again, two moles of a sulfonamide containing two alkylol groups might be united with one mole of phthalic anhydride, for example, so as to act as a bridge or linkage between the two sulfonamide radicals, and result in a material having two free hydroxyl groups, or rather, two unreacted-on alkylol groups, one of which being attached to each of the original sulfonamide residues.

Obviously, where there are two alkylol groups, variations can be obtained including such forms where there is no residual carboxyl group, or other forms where there is both a residual carboxyl and a residual hydroxyl group. Both alkylol groups may be esterified with a single molecular weight of a dibasic acid, or in any one of various other ways which are readily apparent. Then too, disulfonic acids can be converted into compounds having two sulfonamide groups instead of one. In this instance, even greater variations and modifications are possible.

If desired, a sulfonamide may contain a group, such as an alkyl group, or as previously indicated, there may be present an alkylol group which has not been reacted with any other group, or there may be present an alkylol group which is reacted with a monobasic carboxy acid, such as oleic acid, abietic, naphthenic acid, acetic and the like. In other words, if one has a sulfonamide containing two alkylol groups, one need react only one such alkyl group with a polybasic carboxy acid, and the other alkylol group may be esterified with a monobasic acid of the kind previously described.

The term "alkylol sulfonamides" is herein employed to refer to the compounds, whether containing one or two alkylol radicals. Sulfonamides will also be referred to as being monoalkylol sulfonamides and di-alkylol sulfonamides. The following are examples of various compounds which may be employed in the present process.

*Example 1*

215 pounds of N-monohydroxyethyl p-toluene-sulfonamide or 260 pounds of N-di-(monohydroxyethyl) p-toluene-sulfonamide are heated with 148 pounds of phthalic anhydride for one hour at 200° C. until the reaction yields a compound, characterized by presence of a free carboxyl radical.

*Example 2*

The phthalic anhydride is replaced by oxalic acid and a temperature of approximately 108° C. is employed for 8 hours.

*Example 3*

The proper amount of maleic anhydride is substituted for phthalic anhydride in Example 1 and a temperature of 140° C. employed for 8 hours.

*Example 4*

The toluene sulfonamide employed in Examples 1, 2, and 3 is replaced by the corresponding xylene sulfonamide.

*Example 5*

In Examples 1, 2 and 3, the toluene sulfonamide is replaced by the corresponding amount of naphthalene sulfonamide.

*Example 6*

In Examples 1, 2 and 3, the toluene sulfonamide is replaced by the corresponding amyl naphthalene sulfonamide.

*Example 7*

In the prior examples where the sulfonamide contains two monohydroxy alkyl radicals, sufficient of the dibasic acid is added so as to esterify both available hydroxyl radicals, and leave two free carboxyl radicals.

As to further details in regard to the manufacture of reagents of the type employed in the present process, reference is made to British Patent No. 455,694, dated 1936, to British Celanese, Limited and William Henry Moss. It is to be noted that said British patent discloses esterification products derived from monobasic carboxy acids, for instance, acetic acid, as well as polybasic carboxy acid, such as phthalic acid. Obviously, the illustrations in said British patent which are concerned with materials such as acetic acid can be readily modified to be applicable to polybasic acid, such as phthalic acid, succinic acid, oxalic acid, adipic acid, etc.

Although I prefer to use phthalic anhydride as the most desirable source of the polybasic carboxy acid, one may use other polybasic carboxy acids or their anhydrides, such as succinic, malic, fumaric, citric, maleic, adipic, tartaric, glutaric, diphenic, naphthalic, oxalic, pimelic, suberic, azelaic, sebacic, etc. Naturally, a simple derivative of a polybasic acid, such as chlorophthalic acid, can be used as advantageously as phthalic acid itself, although there is no added advantage in the use of the more costly chemical compounds. Obviously, sodium acid phthalate, ethyl acid phthalate, etc. could replace phthalic acid, or the anhydride in esterification reaction involving only one carboxyl radical.

The preferred type of materials of the kind contemplated in the present application may be characterized by the presence of one or more free carboxyl radicals. For instance, if citric acid is employed as the polybasic carboxy acid, and if the sulfonamide contains two alcoholic hydroxyls, one might have as many as four free carboxylic radicals. Incidentally, if the sulfonamide contains two alcoholic hydroxyl radicals, they need not be esterified with the same acid. One might, for example, employ one molecule of phthalic acid and one of maleic acid. Where maleic acid is employed, there is no objection to causing it to undergo the well known maleic acid sodium bisulfite reaction, so as to convert it into a sulfo-succinic acid, or rather, so as to convert the maleic acid residue into a sulfo-succinic acid residue. The acid form may contain residual non-esterified alkylol radicals.

The ordinary sulfonamides containing only one alkylol group are monoalkylol sulfonamides, and thus may be considered as secondary amines. In di-alkylol sulfonamides the remaining amino hydrogen atom has been replaced by a second alkylol radical. There is no reason, of course, why the amino hydrogen atom could not be replaced by an alkyl group, and amines of this type, such as ethyl, hydroxy ethyl sulfonamides are well known. The alkyl group of the type $C_nH_{2n-1}$ may be derived from higher alcohols or fatty acids or the like, and may contain as many as 22 carbon atoms. Incidentally, the alkylol radicals may be derived from ethane, propane, butane, and may contain as many as 10 carbon atoms.

In any event, if in acidic form the material may be employed in such acid form, or it may be employed in any suitable form where the acidic (ionizable) hydrogen atom has been replaced by some suitable metal or suitable organic radical.

In many instances, it is desirable that the materials be used in the form of salts of various metals, especially in the form of salts of alkali metals, including the ammonium salt or the substituted ammonium salt. The salts may be obtained in any suitable manner from metallic oxides or hydroxides, or from ammonia, or from an organic base. Suitable bases, oxides, and hydroxides include sodium, potassium, and ammonium hydroxides; sodium, potassium, and ammonium carbonates and bicarbonates; aqua ammonia; magnesium oxide; calcium oxide; ethylene amine; pyridine; triethanolamine; monoethanolamine; diethanolamine; propanolamine; butylamine; monoamylamine, diamylamine, triamylamine; cyclohexylamine; benzylamine, etc. One may also form the heavy metal salts, such as the iron, copper or lead salts.

Chemical compounds of the kind described containing one or more free carboxyl radicals may be esterified with any one of a number of alcohols or combinations of alcohols, including the following: Monohydric alcohols, such as propyl alcohol, butyl alcohol, amyl alcohol, hexyl alcohol, octyl alcohol, decyl alcohol, duodecyl alcohol, stearyl alcohol; unsaturated monobasic alcohols, such as oleyl alcohol; polyhydric alcohols, such as glycols, ethylene glycol, for example, glycerol, polyglycerols, etc.; ether alcohols, such as diethylene glycol butyl ether, etc.; polyhydric alcohols having at least one remaining free hydroxyl, in which one or more hydroxyls has been previously reacted with a suitable acid, such as monoricinolein, di-ricinolein, monostearin, mono-olein, or the equivalent bodies derived from polyglycerols; acid alcohols, such as hydroxy stearic acid, ricinoleic acid, polyricinoleic acid, triricinolein, etc.; polyhydric alcohols, in which one or more dibasic carboxy acid residues have been introduced, such as a phthalic acid residue, a maleic acid residue, an oxalic acid residue, etc. (such polyhydric alcohol bodies may be employed, providing a free hydroxyl remains); cyclo-alcohols, such as cyclobutanol, etc.; aromatic alcohols, such as phenol, cresol, xylenol, naphthol, etc.; aralkyl alcohols, such as benzyl alcohol; heterocyclic alcohols, such as furfuryl alcohol, abietyl alcohol, etc.; mixed isomer forms of the various alcohols, such as mixed amyl alcohols, etc.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process.

I desire to point out that the superiority of the reagent or demulsifying agent employed in my process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In practicing my process a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone or in combination with other demulsifying procedure, such as the electrical dehydration process.

Having thus described my invention, what I claim as new and desire to secure by Letters Patent is:

1. A process for breaking petroleum emulsions of the water-in-oil type, characterized by subjecting the emulsion to the action of a demulsifying agent comprising a chemical compound of the kind obtainable by esterification of an alkylol aromatic sulfonamide by means of a polybasic carboxy acid body.

2. A process for breaking petroleum emulsions of the water-in-oil type, characterized by subjecting the emulsion to the action of a demulsifying agent comprising a chemical compound of the kind obtainable by esterification of an alkylol aromatic sulfonamide derived from a monosulfonic acid, by means of a polybasic carboxy acid body.

3. A process for breaking petroleum emulsions of the water-in-oil type, characterized by subjecting the emulsion to the action of a demulsifying agent comprising a chemical compound of the kind obtainable by esterification of an alkylol aromatic sulfonamide derived from a monosulfonic acid, by means of a dibasic carboxy acid body.

4. A process for breaking petroleum emulsions of the water-in-oil type, characterized by subjecting the emulsion to the action of a demulsifying agent comprising a chemical compound of the kind obtainable by esterification of an alkylol aromatic sulfonamide derived from a monosulfonic acid, by means of a diabasic carboxy acid body, said esterification involving only one carboxyl radical of said dibasic carboxy acid body.

5. A process for breaking petroleum emulsions of the water-in-oil type, characterized by subjecting the emulsion to the action of a demulsifying agent comprising a chemical compound of the formula:

$$[T.SO_2.N.B_m(C_nH_{2n})_{m'}OH_m]_{m'}$$
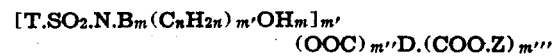
$$(OOC)_{m''}D.(COO.Z)_{m'''}$$

in which T is an aromatic nucleus; B is a hydrogen atom or an alkyl radical containing not more than 22 carbon atoms; D is a polybasic carboxy acid residue, and Z is an ionizable hydrogen equivalent, $n$ represents a small number not greater than 10, $m$ represents the numeral 0 or 1, $m'$ represents the numeral 1 or 2, $m''$ represents the numeral 1 or 2, $m'''$ represents the numeral 0, 1 or 2, with the proviso that $m'''$ and $m''$ must be at least 2 or more.

6. A process for breaking petroleum emulsions of the water-in-oil type, characterized by subjecting the emulsion to the action of a demulsifying agent comprising a chemical compound of the formula:

in which T is an aromatic nucleus; B is a hydrogen atom or an alkyl radical containing not more than 22 carbon atoms; D is a polybasic carboxy acid residue, and Z is an ionizable hydrogen equivalent, $n$ represents a small number not greater than 10, $m$ represents the numeral 0 or 1, $m'$ represents the numeral 1 or 2, $m''$ represents the numeral 1 or 2, $m'''$ represents the numeral 0, 1 or 2, with the proviso that $m'''$ and $m''$ must be at least 2 or more.

7. A process for breaking petroleum emulsions of the water-in-oil type, characterized by subjecting the emulsion to the action of a demulsifying agent comprising a chemical compound of the formula:

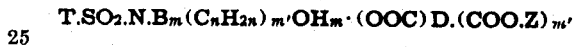

in which T is an aromatic nucleus; B is a hydrogen atom or an alkyl radical containing not more than 22 carbon atoms, D is a polybasic carboxy acid residue, and Z is an ionizable hydrogen equivalent, $n$ represents a small number not greater than 10, $m$ represents the numeral 0 or 1, $m'$ represents the numeral 1 or 2.

8. A process for breaking petroleum emulsions of the water-in-oil type, characterized by subjecting the emulsion to the action of a demulsifying agent comprising a chemical compound of the formula:

in which T is an aromatic nucleus; D is a polybasic carboxy acid residue, and Z is an ionizable hydrogen equivalent, $n$ represents a small number not greater than 10, $m'$ represents the numeral 1 or 2.

9. A process for breaking petroleum emulsions of the water-in-oil type, characterized by subjecting the emulsion to the action of a demulsifying agent comprising a chemical compound of the formula:

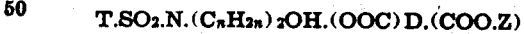

in which T is an aromatic nucleus; D is a polybasic carboxy acid residue, and Z is an ionizable hydrogen equivalent, $n$ represents a small number not greater than 10.

10. A process for breaking petroleum emulsions of the water-in-oil type, characterized by subjecting the emulsion to the action of a demulsifying agent comprising a chemical compound of the formula:

in which T is a polycyclic aromatic residue; D is a polybasic carboxy acid residue, and Z is an ionizable hydrogen equivalent, $n$ represents a small number not greater than 10.

11. A process for breaking petroleum emulsions of the water-in-oil type, characterized by subjecting the emulsion to the action of a demulsifying agent comprising a chemical compound of the formula:

in which T is a polycyclic aromatic nucleus; D is an aromatic dibasic carboxy acid residue, and Z is an ionizable hydrogen equivalent, $n$ represents a small number not greater than 10.

12. A process for breaking petroleum emulsions of the water-in-oil type, characterized by subjecting the emulsion to the action of a demulsifying agent comprising a chemical compound of the formula:

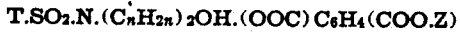

in which T is a polycyclic aromatic nucleus; and Z is an ionizable hydrogen equivalent.

13. A process for breaking petroleum emulsions of the water-in-oil type, characterized by subjecting the emulsion to the action of a demulsifying agent comprising a chemical compound of the formula:

in which Z is an ionizable hydrogen equivalent.

14. A process for breaking petroleum emulsions of the water-in-oil type, characterized by subjecting the emulsion to the action of a demulsifying agent comprising a chemical compound of the formula:

in which Z is an ionizable hydrogen equivalent.

15. A process for breaking petroleum emulsions of the water-in-oil type, characterized by subjecting the emulsion to the action of a demulsifying agent comprising a chemical compound of the formula:

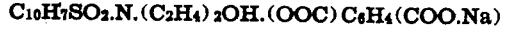

MELVIN DE GROOTE.